UNITED STATES PATENT OFFICE.

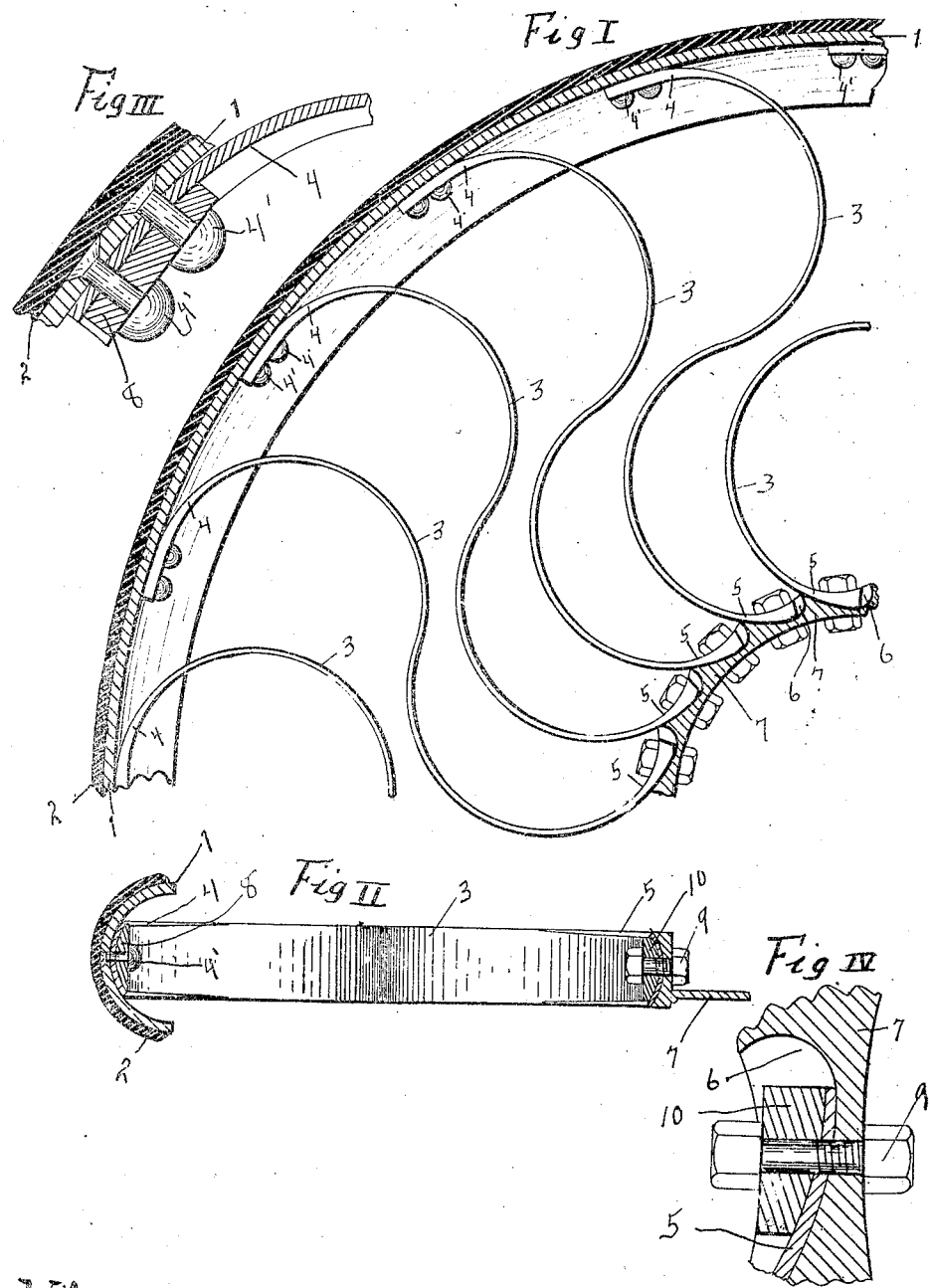

DAVID J. JENNINGS AND HENRY WHITE, OF CLEVELAND, OHIO.

VEHICLE-WHEEL.

1,056,550.

Specification of Letters Patent.  Patented Mar. 18, 1913.

Application filed April 12, 1912. Serial No. 690,359.

*To all whom it may concern:*

Be it known that we, DAVID J. JENNINGS and HENRY WHITE, both citizens of the United States, residing at Cleveland, in the county of Cuyahoga and State of Ohio, have invented certain new and useful Improvements in Vehicle-Wheels; and we do hereby declare the following to be a full, clear, and exact description of the invention, such as will enable others skilled in the art to which it pertains to make and use the same.

This invention relates to vehicle wheels and more especially to such as are known as spring wheels designed for automobiles and other like vehicles to take the place of pneumatic or cushioned tires.

The object of this invention is to supply a simple construction and an efficient wheel which comprises various features tending to strengthen the structure without detracting from its cushioning or resilient action.

This invention further consists in the peculiar details of construction comprising parts and combination of parts and also in the structure as a whole all of which will be hereinafter fully set forth and claimed.

In the drawings, Figure I, is a segmental view in side elevation showing the manner of embedding the ends of the springs, parts of this view being in section for better illustration. Fig. II, is a vertical sectional view taken though one half of the diameter of the wheel disclosing a sectional view of the hub connection and the rim connection and also the rubber tire. Fig. III, is a sectional view in enlarged form showing the method of fastening the spring to the rim of the wheel. Fig. IV is an enlarged view in section showing the manner of mounting and securing the spring to the hub of the wheel.

As hereinabove mentioned this wheel is designed as a substitute for wheels having pneumatic or cushioned tires and is adapted in its construction to have the equivalent of resiliency of such wheels while at the same time having the same tractive effects, greater strength and less costly upkeep.

Heretofore, in wheels of this type, one objectionable feature has been that while in turning or skidding the lateral strain on the spring spokes has tended to both loosen the connections between the spokes and the hub and rim or shear their fastenings or break the spring at the point of fastening, this being generally, heretofore the weakest part of the spring and as it is the part designed to sustain the greatest strain it is important that the method of fastening at the above points and also the construction of the spring at these points be such as to eliminate weakness and shearing action. This is accomplished in this invention by the following construction.

1, represents the wheel rim which is preferably made of metal convex in cross section on its outer periphery and concave on its inner periphery the outer periphery being preferably provided with a rubber tire 2, fitting over the outer periphery of the rim and inclosing it as illustrated.

3, represents a series of compound or S-shaped spokes of spring metal the same being more or less uniform in width and thickness throughout excepting at their outer ends 4 and inner ends 5 at which ends they are channeled or provided with side flanges being curved in cross section to seat themselves respectively in the rim and pockets 6 provided around the outer periphery of the hub portion 7.

In order to secure the outer ends of the springs within the inner concaved periphery of the rim the curvature of the spokes at this end is so formed as to seat snugly or conform to the inner surface of the rim laying along the same for a distance sufficient to receive the fastening rivets or bolts 4', which pass first through blocks 8, conforming to the inner curvature at this end of the spoke thus aiding to hold this end snugly in place and strengthen the end of the spoke at this part, thus the entire fastening and construction entirely eliminates any shearing action through the lateral strain at this part of the wheel, bringing this strain to bear upon the reinforced ends of the spring spokes and the curved sides of the concaved portion of the rim taking the lateral strain entirely from the bolts or rivets 4'. The hub ends of the spokes are also reinforced as at 5 by turning the metal forming it convex on the outer surface and concave on the inner surface and forming the extreme ends curved or rounding. The ends 5 of the spokes are received in pockets 6, formed in the outer periphery of the hub 7 which pockets are so formed as to receive these ends snugly in which pockets they are fastened by means of bolts and nuts 9 which first pass through blocks 10, shaped to conform to the inner surface of the flanged part of the spring thence through the end of the spring and into the hub. It will thus be seen that at this point also the spring spokes are strengthened and reinforced and at the same time the lateral strain is entirely born by the metal of the ends of the spring and the side walls of the pockets or recesses in the periphery of the hub.

From the above description taken in connection with the drawing it will be clearly seen that the spring spokes and their fastenings, both to the rim and to the hub are reinforced and strengthened against lateral strains and weaknesses where the strain is greatest and where generally heretofore the parts were weakest. It will also be noticed that the reinforcement serves to bring the spring action of the spokes between the points below the extreme inner periphery of the rim and above the extreme outer periphery of the hub thus making the fastened ends of the springs solid and not apt to be loosened or worn.

Other advantageous features are apparent without further description.

What we claim is:

1. In a wheel of the type set forth comprising S shaped spring spokes having their ends reinforced by bending the metal upon itself to form concave channels curved in cross section, seats formed respectively in the rim and hub to conform to the shape of the respective ends of the spring spokes, blocks adapted to be received in the concaved portion of the ends of the spokes and fastening devices passing through said blocks for retaining the ends of the spokes in their respective positions substantially as set forth.

2. In a wheel of the type set forth comprising S shaped spring spokes, said spokes having their ends reinforced by bending the metal upon itself to form concave channels curved in cross section, seats formed in the hub and rim for the reception of the respective ends of the spokes, blocks shaped to conform to the concaved portion of the said spokes and adapted to be held in position in said concaved portions of the spokes by suitable fastenings substantially as and for the purpose set forth.

Signed at Cleveland in the county of Cuyahoga and State of Ohio this 28th day of March 1912.

DAVID J. JENNINGS.
HENRY WHITE.

Witnesses:
JOHN J. DONNELLY,
ALBERT B. DONNELLY.